(12) United States Patent
Voto et al.

(10) Patent No.: US 9,460,037 B2
(45) Date of Patent: Oct. 4, 2016

(54) FLEXIBLE MOBILE DEVICE CONNECTIVITY TO AUTOMOTIVE SYSTEMS WITH USB HUBS

(71) Applicant: Delphi Technologies, Inc., Troy, MI (US)

(72) Inventors: Robert Voto, Clarkston, MI (US); Shyambabu Yeda, Rochester Hills, MI (US); Craig Petku, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/487,947

(22) Filed: Sep. 16, 2014

(65) Prior Publication Data

US 2015/0089092 A1    Mar. 26, 2015

Related U.S. Application Data

(60) Provisional application No. 61/882,915, filed on Sep. 26, 2013.

(51) Int. Cl.
*G06F 13/38* (2006.01)
*G06F 13/40* (2006.01)

(52) U.S. Cl.
CPC ......... *G06F 13/385* (2013.01); *G06F 13/4022* (2013.01); *G06F 13/4045* (2013.01); *G06F 2213/0042* (2013.01); *G06F 2213/4004* (2013.01)

(58) Field of Classification Search
CPC .............. G06F 13/385; G06F 2213/3812; G06F 13/4022; G06F 13/4045; G06F 2213/4004; G06F 2213/0042
USPC .......................................................... 710/15
See application file for complete search history.

(56) References Cited

U.S. PATENT DOCUMENTS

| | | | |
|---|---|---|---|
| 7,130,656 B2 | 10/2006 | Okagaki et al. | |
| 7,280,802 B2 | 10/2007 | Grady | |
| 7,478,191 B2 | 1/2009 | Wurzburg et al. | |
| 7,502,878 B1 * | 3/2009 | Wright ............... | G06F 13/4022 710/37 |

(Continued)

OTHER PUBLICATIONS

Al-Ani, Tarik et al.; Android-based In-Vehicle Infotainment System (AIVI); IS PGD 2010, Oct. 26, 2010, Dunedin, New Zealand.

(Continued)

*Primary Examiner* — Ernest Unelus
(74) *Attorney, Agent, or Firm* — Robert J Myers

(57) ABSTRACT

A system which is configured to enable a vehicle's embedded USB Host system to connect to multiple mobile devices through a USB Hub, regardless of whether the mobile devices are configured to act as USB Hosts or USB Devices, without the need to add or provide OTG controllers in the system or additional vehicle wiring, or inhibiting the functionality of any consumer devices operating in USB Device mode connected to a vehicle system Hub while another consumer device connected to the same Hub operates in USB Host mode. Preferably, the system is configured to provide that no additional cabling is required, and no hardware changes are required to be made to the HU. The system can be employed between a vehicle's embedded USB Host, USB Hub and at least one consumer accessible USB port. In the case where the consumer device is acting as a USB Host, signals between the consumer device and the vehicle's embedded USB Host are processed through a bridge, thereby rendering the consumer device compatible with the vehicle's embedded USB Host.

17 Claims, 8 Drawing Sheets

(56) References Cited

U.S. PATENT DOCUMENTS

| | | | |
|---|---|---|---|
| 8,447,598 B2 | 5/2013 | Chutorash et al. | |
| 8,447,890 B1 | 5/2013 | LeTourneur et al. | |
| 2003/0167345 A1* | 9/2003 | Knight et al. | 709/249 |
| 2006/0056401 A1 | 3/2006 | Bohm et al. | |
| 2006/0227759 A1* | 10/2006 | Bohm | G06F 13/4022 |
| | | | 370/351 |
| 2007/0086724 A1 | 4/2007 | Grady et al. | |
| 2007/0156293 A1* | 7/2007 | Kellzi et al. | 701/1 |
| 2008/0005262 A1 | 1/2008 | Wurzburg et al. | |
| 2009/0117890 A1 | 5/2009 | Jacobsen et al. | |
| 2010/0260350 A1 | 10/2010 | Chutorash et al. | |
| 2011/0054721 A1 | 3/2011 | Goodrich et al. | |
| 2011/0124300 A1 | 5/2011 | Sinai | |
| 2012/0134506 A1 | 5/2012 | DeBiasio et al. | |
| 2012/0191811 A1 | 7/2012 | Ng et al. | |
| 2012/0290859 A1 | 11/2012 | Saladin et al. | |
| 2013/0053003 A1 | 2/2013 | King, II | |
| 2013/0106750 A1 | 5/2013 | Kurosawa | |

OTHER PUBLICATIONS

Al-Ani, Tarik; Android In-Vehicle Infotainment System (AIVI); Jun. 2011, Dunedin, New Zealand.

Ellis, Brian; USB in Automotive: Not Just for PCs Anymore; Cypress Semiconductor Corp.; Sep. 7, 2006.

Koch, Niels; The Car Entertainment System; InTech; 2011.

\* cited by examiner

FLEXIBLE MOBILE DEVICE CONNECTIVITY TO AUTOMOTIVE SYSTEMS WITH USB HUBS

RELATED APPLICATION

Priority Claim

This application claims the benefit of U.S. Provisional Application Ser. No. 61/882,915, filed on Sep. 26, 2013, which is hereby incorporated herein by reference in its entirety.

BACKGROUND

The present invention generally relates to Universal Serial Bus ("USB") connectivity between, for example, mobile consumer devices and vehicle electronic systems. More specifically, the present invention relates to a system which is configured to provide that consumer devices that act as either USB host or USB device can connect to a vehicle's embedded USB host that does not have On the Go ("OTG") capability through an embedded USB hub in the vehicle.

Historically, mobile consumer devices such as media players, smart phones, tablets and the like have relied on connections to other devices, such as laptop or desktop personal computers ("PC's") to acquire content, exchange data, and charge the device's internal battery. For many years now, that has been accomplished through USB ports on each device. The use of USB technology is suitable for such needs since it is commonly available, familiar to the end user, cost effective and ubiquitous. USB protocols require a point-to-point connection in which one end is the USB Host or master, and the other end is a USB Device or slave. In this way, the flow of messages between the two devices is managed and controlled, whereby the USB Device responds to messages initiated by the USB Host. Historically, PC's have provided USB Host ports for connection to simpler USB Devices such as printers, memory sticks, mobile phones, etc. The USB Host has a greater burden of software and hardware requirements than a USB Device, so it has made sense to designate the PC as the USB Host in such systems.

In vehicle systems that employ USB connections, the same concepts apply. In such systems, the vehicle is typically the USB Host. The USB Host function is often embedded into a component of the vehicle infotainment system, such as into the radio or other control module. Typically, multiple USB ports are strategically designed into the vehicle in locations convenient for the driver and passengers to connect their consumer devices. Once a consumer device is connected to one of the ports, the device begins charging and the vehicle infotainment system can access content on the consumer device. This is useful to enable features such as streaming music, video and other services the device may provide.

Such a system requires that each of the USB ports be physically connected to the vehicle's USB Host in a manner suitable for USB data flow. This is accomplished through electrical cabling which is embedded in the vehicle, and which connects each of the ports to the USB Host. Since there can be many USB ports in a vehicle, and each port requires a cable to connect the port to the USB Host, it is desirable to share cabling when possible to minimize cost and mass of the vehicle. This is accomplished through the use of USB Hubs. USB Hubs allow a single USB Host to connect to multiple USB Devices over a single cable between the USB Host and the USB Hub. As shown in FIGS. 1 and 2, a single USB Hub can connect one USB Host to several USB Devices. Specifically, FIG. 1 illustrates a system wherein a self-powered USB Hub having a plurality of USB ports connects to a plurality of USB Devices (via a plurality of consumer-facing USB ports), while FIG. 2 illustrates a system wherein a self-powered USB Hub provides not only a plurality of USB ports which are in communication with a plurality of consumer-facing USB ports, but also a Secure Digital ("SD") card reader which is connected to a consumer-facing SD card connector. Other portions of FIGS. 1 and 2, such as Power Management, are standard in the industry and self-explanatory upon viewing FIGS. 1 and 2.

Furthermore, as shown in FIG. 3, multiple USB Hubs can be tiered, such that USB Hubs connect to other USB Hubs. Specifically, FIG. 3 illustrates a vehicle system architecture that includes a central vehicle microcontroller (also referred to as the Head Unit or "HU"). Connected to the Head Unit are components or systems such as displays, the audio system, entertainment system and the driver controls. The Head Unit may be architected as a single module encompassing all functions or distributed such that various functions are managed by individual modules. The Head Unit includes a Root USB Hub which is typically connected to one or more downstream USB Hubs distributed throughout the vehicle. Each USB Hub has a plurality of downstream ports (at least one of which may be an SD reader or USB audio device), thereby effectively providing that each USB port in the vehicle has a connection to the USB Host or Head Unit. In FIG. 3, for example, the Root Hub is embedded in the radio, and is connected to four (4) self-powered USB Hubs, wherein one is in the vehicle's center console, one is in the vehicle's center stack, and two are in the vehicle's rear seats.

Recently, mobile devices such as smart phones have gained in popularity. This is, in part, due to their usefulness as standalone computing devices. With advances in consumer electronic technology and increases in the speed of mobile networks, these devices are no longer reliant on being connected to PCs to access content. These smart mobile devices now have many of the same hardware resources, connectivity and software operating systems that only PCs had in past years. As has been the case with desktop PCs, accessories for these mobile devices have become available to aid in their ease of use. These accessories have included devices such as keyboards, mice, displays, touchscreen, audio systems, and other interface devices. These accessories commonly connect via a USB connection. By way of established convention in the consumer electronics market, these accessories are typically low cost and limited in USB capability to act only as a USB Device. To connect them to a smart phone, the smart phone must be the USB Host. Therefore, leading mobile device manufacturers and system designers have begun designing their mobile device products (i.e. smart phones, tablets, etc) to support both USB Host and USB Device roles. In other words, the phone may configure itself such that it can function as a USB Device when it needs to be, or as a USB Host when it needs to be. Recently, the system level design thinking has shifted towards viewing smart phones as the USB Host, and any device connecting thereto as the USB Device. Again, this is not surprising since this is exactly how laptops and PCs work today. Extending this trend into the future, it can be predicted that the smart phone will act primarily as the USB Host, and will rarely or never act as a USB device. This presents some problems for automotive systems.

As explained previously, automotive systems have a USB Host and require USB Devices to connect to it. If a phone acts as a USB Host, then the system will not function since by USB convention, two USB Hosts cannot directly connect with each other. Automotive manufacturers desire compatibility with smart phones and are therefore motivated to adapt to this changing technology. A redesign of the USB architecture in the vehicle is thus necessary such that the vehicle can act either as the USB Host (when necessary to connect to USB Devices such as memory sticks, thumb drives, etc.) or USB Device (when necessary to connect to USB Hosts, such as a smart phone which demands to be USB Host rather than USB Device.

The USB organization has added a standard that addresses the need for devices to act as either USB Host or USB Device and as such can be considered a "dual role" USB controller. It is referred to in USB nomenclature as "On The Go" or "OTG" for short. Any device that meets the OTG standard can act as either USB Host or USB Device and can change roles dynamically. Therefore, one possible approach to modifying the vehicle USB architecture to support all use cases is to upgrade the vehicle's USB Host to USB OTG. This solution addresses the issue but has some disadvantages. First, USB Hubs do not support OTG and can no longer be used in the system. Each consumer accessible USB port that supports OTG must have a dedicated wire link to a dedicated OTG controller in the Head Unit thus negating the wiring savings associated with use of USB Hubs. As a result several costly cables may need to be added to the vehicle's electrical system. Second, there may not be enough OTG controllers available in the Head Unit to connect to each of the vehicle's user accessible USB ports. This then forces the vehicle designer to choose a limited number of the many USB ports in the vehicle to support the OTG function and run dedicated USB cables to them. This can lead to user confusion and dissatisfaction since only certain consumer ports support the required functionality. Also, ports that support OTG may be co-located with other physically identical ports that do not. If the user chooses the wrong one, the applications they desire to run from the consumer device that requires USB Host mode won't work.

Another possible solution is to implement custom USB hubs wherein the USB Hub is able to dynamically swap its upstream port with one it's downstream ports when commanded to do so. System solutions built with this concept still require OTG controllers in the head unit but benefit from the fact that no additional wires need to be installed in the car. The existing USB cable between the USB OTG Host and the USB Hub can facilitate the necessary USB communications between the USB OTG controller in the Head Unit (HU) and a consumer device in USB Host (such as a smart phone). This solution also has some disadvantages however. For example, when the USB Hub is commanded to swap it's upstream port with a downstream port, all other downstream ports of the USB Hubs lose their data connection with the Head Unit. While in this mode the Head Unit access to the other downstream ports of the hub cease. This may prevent use of certain vehicle system functions such as navigation or audio playback that may need consistent access to the other downstream ports of the hub to function. Furthermore, it requires the HU to have an available USB OTG port and a signaling path to control the hub upstream/downstream port configuration.

SUMMARY

An object of an embodiment of the present invention is to provide a system which is configured to enable a vehicle's embedded USB Host system to connect to mobile devices through a USB Hub, regardless of whether the mobile devices are configured to act as USB Hosts or USB Devices, without the need to provide OTG or dual role controllers in the head unit and without the need to provide additional cabling in the vehicle. Preferably, no hardware changes are required to be made to the USB Host circuits in the HU.

An embodiment of the present invention provides a system which can be employed between a vehicle's embedded USB Host and at least one, but preferably multiple, consumer facing USB ports provided in the vehicle for connection to consumer devices. The system is configured to recognize and control whether the consumer device is required to be connected to each USB port as a USB Host or as a USB Device. Further, the system is able to dynamically switch the device connection between USB Device mode and USB Host mode when desired. In the case where the consumer device is acting as a USB Device, signals are routed normally through a USB Hub to the Head Unit. In the case where the consumer device is acting as a USB Host, signals between the consumer device and the vehicle's embedded USB Host are routed and processed through a USB Host to Host Bridge which is connected to the USB Hub, thereby rendering the consumer device compatible with the vehicle's embedded USB Host.

The present invention is capable of being implemented in several different embodiments. For example, an embodiment of the present invention comprises a USB Hub Module having a USB Hub, USB Bridge, and USB routing switches implemented as discrete devices. The USB Hub upstream port is configured to be connected to a vehicle's embedded USB Host (such as a USB Host in a Head Unit). The USB Hub Module also includes a switching device (such as USB analog multiplexing switches for example) that is configured to route each consumer port to either the Bridge or the Hub. The USB Bridge is configured to effectively control the switching device. The USB Bridge is configured, based on signals from the Head Unit, whether the consumer device which is connected to the USB port is acting as USB Host or USB Device. In the case where the consumer device is acting as USB Host, the USB Bridge controls the switching device to route the USB port to the Bridge. The Bridge processes the signals from the consumer device and provides them to the USB Hub, thereby rendering the consumer device compatible with the vehicle's embedded USB Host. In the case where the consumer device is acting as USB Device, the USB Bridge controls the switching device such that the switching device provides the signals to the USB Hub, effectively bypassing the Bridge.

Still another embodiment of the present invention provides that the USB routing logic, USB Bridge, and USB Hub are integrated in a single combination USB Hub/USB Bridge Integrated Circuit (IC).

Still other embodiments are entirely possible, some of which are described and illustrated herein. For example, the concept can be extended to include additional embedded USB Device functions such as USB HID and USB Audio. Further it is also envisioned that all consumer facing USB ports of the Hub Module can emulate or otherwise support dual role USB capability provided that each downstream port has a Bridge to support USB Host mode for the connected device and a direct connection to the USB Hub to support USB Device mode. In all cases, compliance to USB protocols and architectures is preferably maintained.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
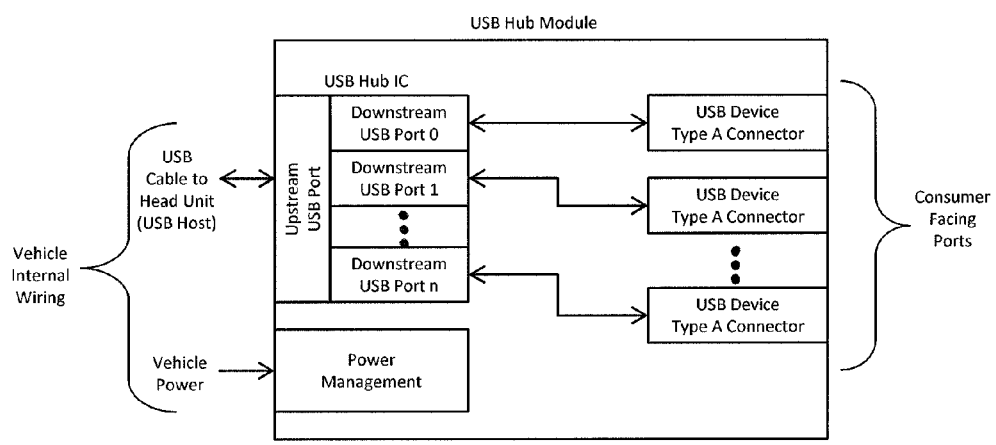
FIG. 1 illustrates a system wherein a multiple port self-powered USB Hub functions to connect a single USB Host to a plurality of USB ports.
Figure 2:
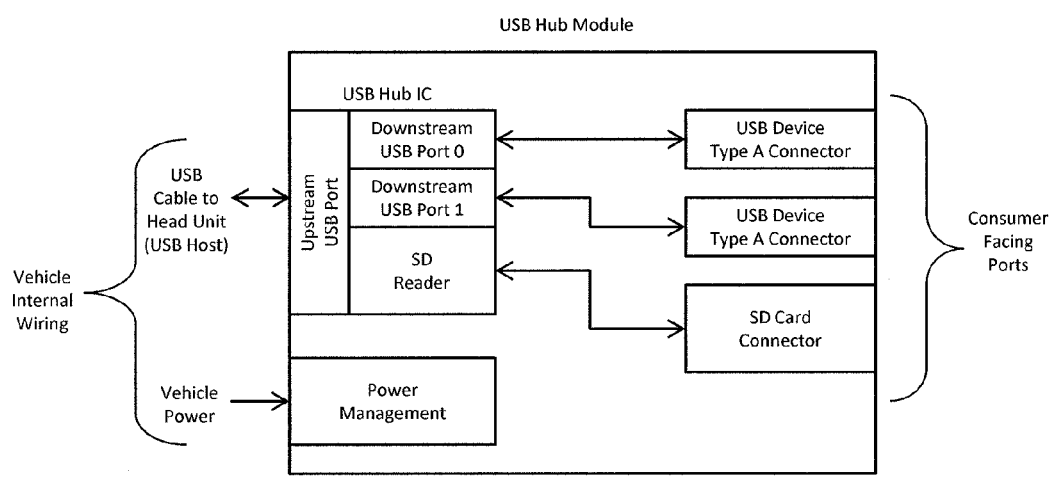
FIG. 2 illustrates a system wherein a self-powered USB Hub provides not only a plurality of USB ports, but also a Secure Digital ("SD") card reader.
Figure 3:
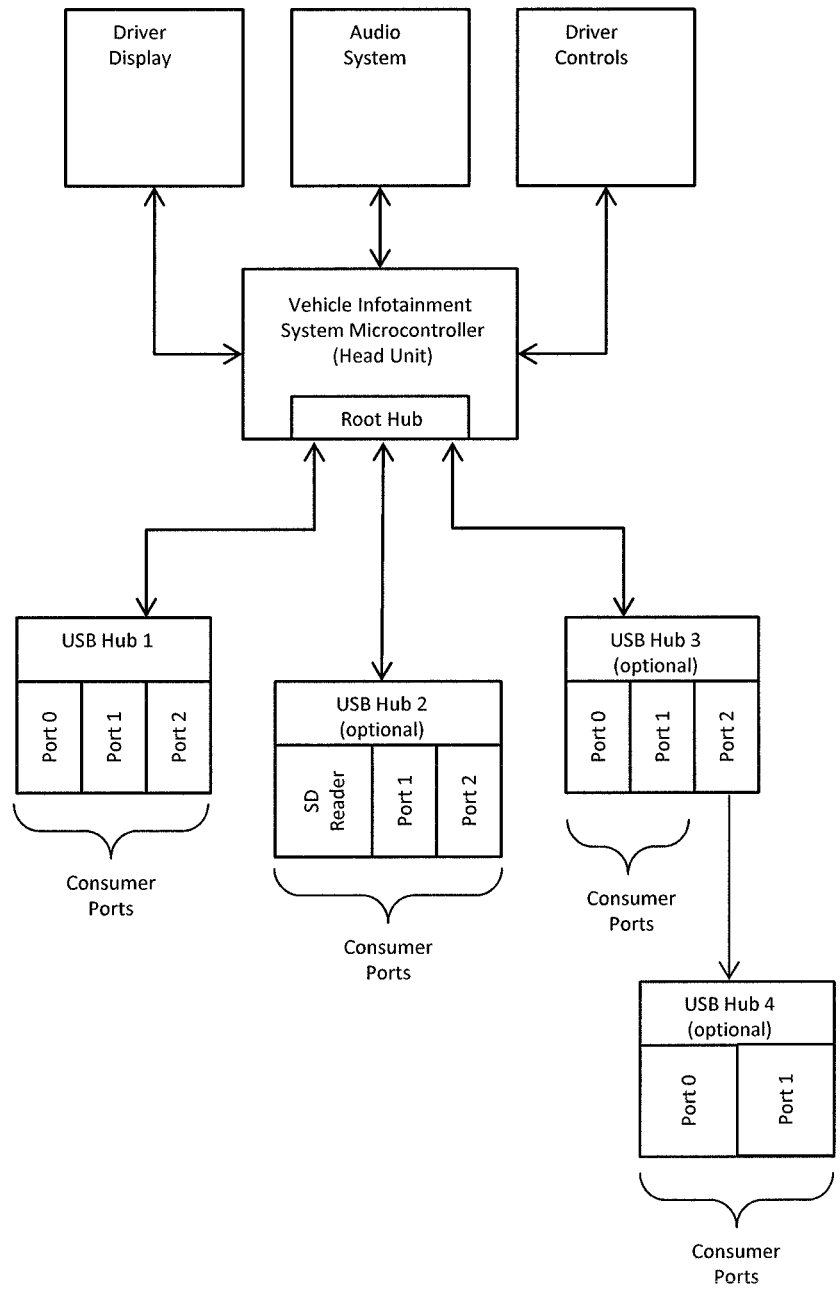
FIG. 3 illustrates a vehicle infotainment system structure wherein multiple USB Hubs are connected together or tiered, such that USB Hubs feed other USB Hubs.

While this invention may be susceptible to embodiment in different forms, there are specific embodiments shown in the drawings and will be described herein in detail, with the understanding that the present disclosure is to be considered an exemplification of the principles of the invention, and is not intended to limit the invention to that as illustrated.

Figure 4:
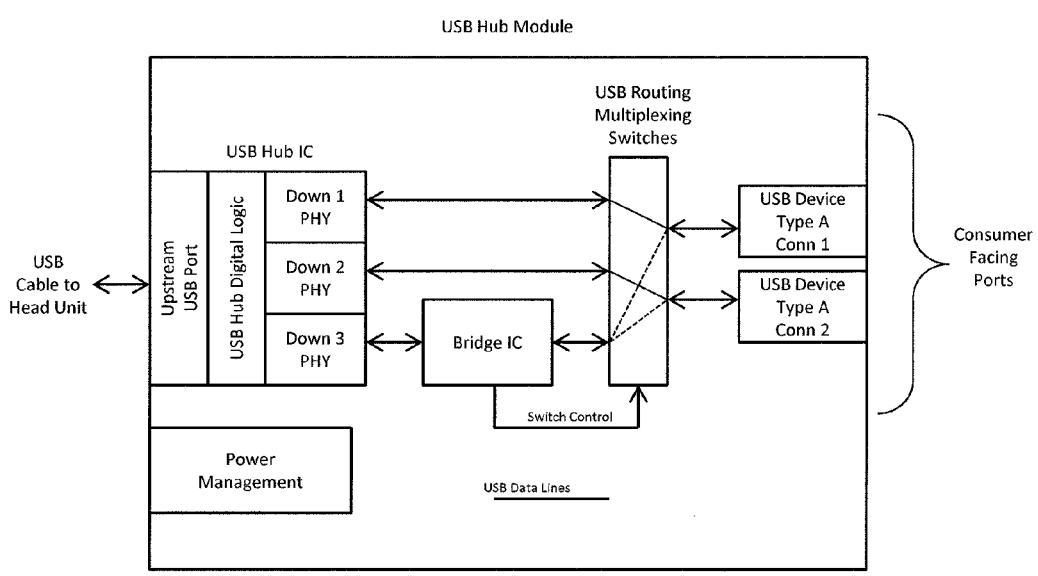
FIG. 4 illustrates a system which is in accordance with an embodiment of the present invention, wherein a USB Hub, USB Bridge and a switching device are provided as discrete components.

FIG. 4 illustrates a system which is in accordance with an embodiment of the present invention. The system is configured to effectively render a vehicle's embedded USB Host compatible with consumer devices which are configured to also act as USB Host or USB Device. The system is in the form of a self-powered USB Hub Module having a USB, a USB Bridge, and a switching device implemented as discrete devices. The USB Hub is preferably provided in the form of an integrated circuit (IC), and is configured (via an upstream USB port) connected to a vehicle's embedded USB Host (such as a USB Host in a Head Unit) via vehicle internal wiring, such as, in one embodiment, via a single USB data cable between the Head Unit and USB Hub. The USB Hub also includes a plurality of downstream USB ports, at least one of which is connected to a USB Bridge (which also is preferably provided in the form of an integrated circuit (IC)). At least one downstream USB port of the USB Hub is connected to a switching device (such as USB analog multiplexing switches, for example). The switching device is configured to be connected to at least one USB port in the vehicle for connection to a consumer device. The USB Bridge is configured to effectively control the switching device although other control mechanisms are envisioned. The USB Hub Module is configured such that signals received from at least one USB port are received by the switching device, and the switching device routes the signals to the USB Bridge or the USB Hub. In the case where the consumer device is acting as USB Host, the USB Bridge processes the USB packets from the consumer port and provides them to the USB Hub, thereby rendering the consumer device compatible with the vehicle's embedded USB Host. In the case where the consumer device is acting as USB Device, the USB Bridge controls the switching device such that the switching device provides the USB signaling directly to the USB Hub, bypassing the Bridge.

As shown in FIG. 4, the system also includes Power Management structure, as well as some other conventional structure not specifically shown in FIG. 4, but which would be readily assumed to be present by one having ordinary skill in the art.

In use, the Head Unit controls the switching device via the USB Bridge hardware or any other convenient means of control. The HU software application may choose to enable, for example, a phone on any one of the consumer USB ports, by requesting, commanding or otherwise knowing the phone is required to be in USB Host mode and commanding the routing of the specific USB port the phone is attached to the USB Bridge. Once routed to the USB Bridge, the phone will detect a USB Device is connected and the phone will begin the standard USB enumeration sequence. The detection and enumeration processes are defined by USB standards and not explained here in detail. However, for purposes of describing the operation of the invention, a general understanding is provided herein. The enumeration process follows a strict sequence of USB descriptor requests from the USB Host and USB descriptor responses from the USB Device that allow the Host to determine the capabilities and functions of the Device and configure the USB Device for operation. Once the complete set of device descriptors are known the USB Host will then load the appropriate USB driver(s) and applications to support in the functionality that the USB Device provides. In the scope of this invention it is envisioned that the responses to the descriptor requests made by the phone (USB Host) are either answered locally by the Bridge or preferably, the requests are forwarded through the Bridge to the Head Unit where its device drivers process the request and return the response. The descriptor responses from the device driver are conveyed to the USB Bridge, which then, in turn, passes them to the phone. By passing descriptor request to the Head Unit drivers and returning the responses from the Head Unit drivers back to the consumer device, the Bridge appears as a transparent component in the USB system architecture. The system capabilities are controlled by the Head Unit and the system remains flexible without need for changes to the Bridge firmware or hardware when the system designer requires changes to the descriptor responses. Once the consumer device completes the enumeration process, the Head Unit's USB functional capabilities are known to the consumer device and the consumer device may enable use of those functions over USB communication. At this point, the consumer device or the Head Unit may begin activating any number of supported services such as data connections, streaming audio and streaming video to and from the vehicle via the USB Bridge.

Another embodiment of the present invention can be provided, wherein the bridge is configured to act as an OTG port thus negating the need for switches and/or routing logic. In this case there would exist one Bridge functional block for each downstream port. This embodiment would effectively be a more generalized case of the example illustrated in FIG. 4. FIG. 4 shows just one Bridge that any one of the consumer USB ports can be routed to. With just one bridge, only one consumer USB port can be connected to a USB host at a time. However, if each downstream port of the Hub has a dedicated Bridge, then multiple consumer ports can support connection to USB Host devices at the same time. Thus, any consumer port can be in either USB Host or USB Device mode at any time independently of the others.

Figure 5:
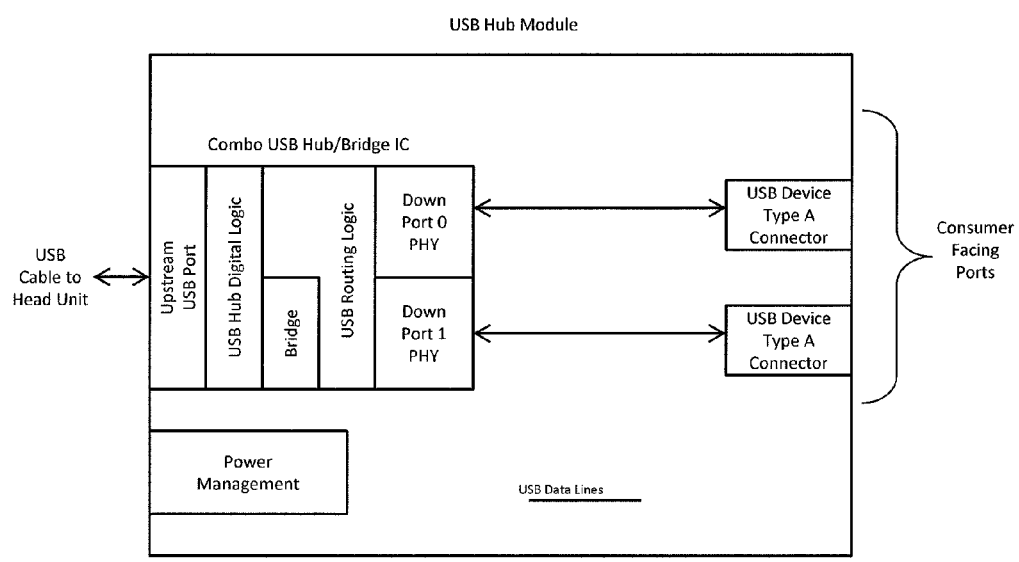
FIG. 5 illustrates a system which is in accordance with an alternative embodiment of the present invention, wherein USB routing/switching logic and a USB Bridge are integrated with a USB Hub in a combination USB Hub/USB Bridge Integrated Circuit (IC)

FIG. 5 illustrates an alternative embodiment wherein the switching device comprises USB routing logic, and both the USB routing logic and the USB Bridge are integrated with the USB Hub in a combination USB Hub/USB Bridge Integrated Circuit (IC). This configuration has cost and size advantages over building it with discrete components connected together on a printed circuit board.

Figure 6:
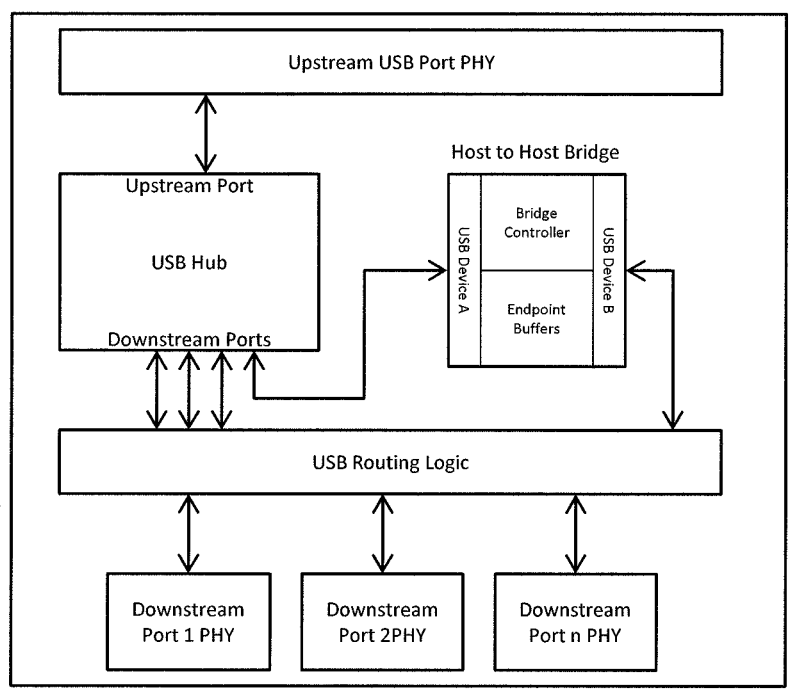
FIG. 6 illustrates the different components of the combination USB Hub/Bridge IC shown in FIG. 5.

FIG. 6 illustrates the internal components of the USB Hub/USB Bridge Integrated Circuit (IC) shown in FIG. 5. As shown, preferably the components of the USB Bridge include a bridge controller as well as endpoint buffers. While the exact configuration of endpoints is effectively up to the system designer to choose for a particular need, a specific example of one possible endpoint configuration is shown in FIG. 7; however, many others are possible.

Figure 7:
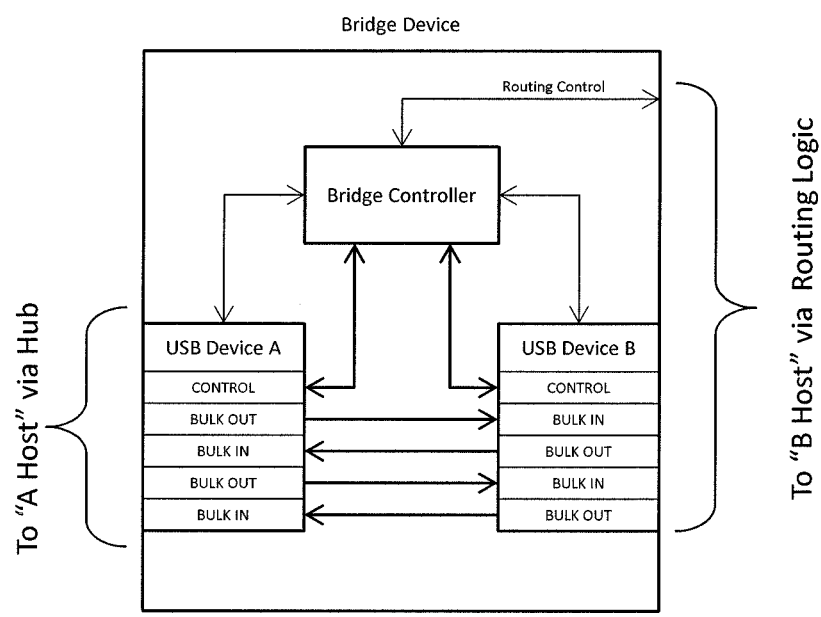
FIG. 7 illustrates one possible endpoint configuration of the USB Bridge shown in FIGS. 5 and 6.

As shown in FIG. 7, the endpoints of the Bridge may be designed to support multiple pipes of Bulk USB data connections between the Host A (Head Unit) and Host B (consumer device). In the Bridge, the IN endpoints of Device A are connected to the OUT endpoints of Device B and the OUT endpoints of Device A are connected to the IN endpoints of Device B. The design of the Bridge may be such that the data flow between the endpoints may be direct or buffered. For example, in the case of direct connection, once a USB packet is received from Host A on a Device A OUT endpoint, the internal logic of the Bridge moves to packet to the Device B IN endpoint if it is available. If Device B IN endpoint is full or otherwise not available then subsequent attempts of Host A to send more packets to Device A in the Bridge will be rejected until such time that the Device B IN endpoint is clear and the contents of the Device A OUT buffer is moved to it. Alternatively, there may exist a local buffer in the Bridge between the endpoints of Device A and B. For example, packets received on an OUT endpoint of Device A are placed in a local memory device for temporary storage until Device B IN endpoint is ready for them. The OUT endpoints are thus capable of receiving multiple packets from the Host until the buffer is full. Likewise the IN endpoints may, at times, transmit multiple packets until the buffer is empty. Such buffers are not required, but are envisioned, to improve system throughput performance in certain circumstances where one of the USB Hosts is occasionally busy and not keeping up with USB transactions at the same rate as the other USB Host. Regardless of the buffer configuration, the Bridge hardware has IN and OUT endpoints on Device A mapped to OUT and IN endpoints respectively on Device B, thus forming a bidirectional bridge that passes USB traffic between two USB Hosts with bandwidth sufficient to support the application requirements of the system.

Also shown in FIG. 7, Device A and Device B provide a bidirectional Control endpoint connected to their respective USB Hosts. Control endpoints are required per USB standard to support USB defined control messages between the Host and Device both during and after the enumeration sequence. Optionally, USB endpoints may also be utilized per USB standard to employ messages intended to control user defined custom device specific behavior, referred to as Vendor Specific messages. As can be seen in FIG. 7, the Control endpoints are mapped to the Bridge Controller (BC). The BC logic may be implemented in hardware or preferably software. The BC provides the capability to send, receive and process USB standard Control endpoint messages as well as vendor specific messages essential to the control and operation of the Bridge. At system startup, the A Host requests and receives descriptors from the BC via the Control endpoint. Once complete, Host A then loads the Bridge Driver in its software stack and configures the custom Bridge hardware for operation. Host A can then control the functions of the Bridge, such as USB switch routing control. The system is now ready to accept connection with USB Host mode consumer devices on the B Device of the Bridge. When such a connection is made, the BC will notify the Bridge Driver in Host A by sending a message on the control endpoint to Host A. Further, Host B will begin sending descriptor requests on the control endpoint to Device B in Bridge. The BC receives theses requests, encapsulates them with information that identifies them as descriptor requests from Host B and passes them to the Bridge Driver on Host using the control endpoint. Host A Bridge Driver receives these requests, identifies them as descriptor requests and passes the requests on to other software components in Host A system and waits for the descriptor responses. The descriptor responses are encapsulated by the Bridge driver to indicate they are descriptor responses that are to be forwarded to Host B. The response is then sent to the BC via the control endpoint. The BC receives them, identifies them as descriptor responses that should be forwarded to Device B and places them on the control endpoint for Device B. This process of receiving and forwarding messages back and forth between the two hosts continues until the enumeration process is complete with Host B. From that point on the two hosts may begin to use the IN and OUT endpoints to transfer application data and services over the bulk endpoints.

Figure 8:
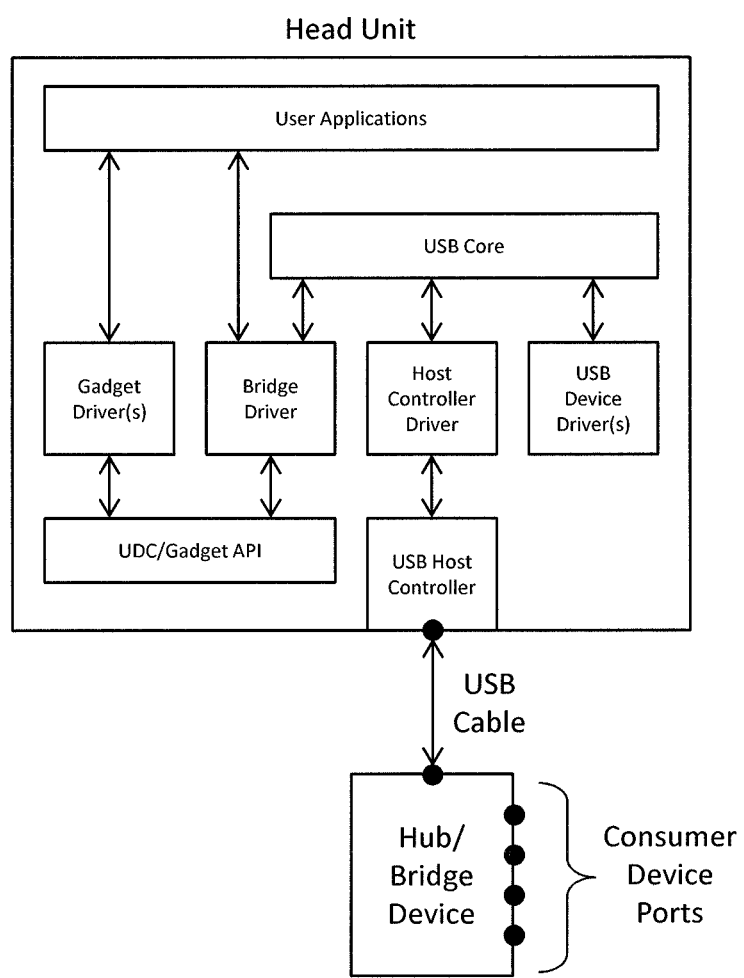
FIG. 8 illustrates an example implementation of a Head Unit Software Architecture.

FIG. 8 illustrates one possible configuration of the system architecture including software components in the Head Unit interfacing with the Bridge/Hub. There are multiple ways that the operating system and software architecture can be constructed to support the functions of the USB Bridge/Hub. In FIG. 8, a typical Linux implementation is shown including the Bridge/Hub Module and the Head Unit. The system design utilizes standard Linux Kernel components and configurations and should be familiar to those skilled in the art. The Head Unit USB Host Controller hardware is driven by the Host Controller Driver. The Host Controller Driver is connected to the USB Core. The USB Core connects the HCD with the standard USB Linux Device Drivers and the custom Bridge Driver. The Bridge Driver is configured to optionally connect directly to the User Space Application software or to the USB Gadget Driver depending on system architecture. The custom Bridge Driver plays a dual role of both controlling the functions of the Bridge hardware as well as providing a data path between the gadget device drivers and applications running on the Head Unit. The architecture illustrated is capable of handling both the operation and data paths associated with the Bridge and the Hub at the same time, thus allowing concurrent operation of consumer devices operating in USB Device mode with consumer devices operating in USB Host mode. In one embodiment, the Hub/Bridge supports simultaneous active USB data connections between the Head Unit and multiple consumer devices, at least one of which being in host mode while the others are in device mode. In another embodiment, the Hub/Bridge supports simultaneous active USB data connections between the Head Unit and some combination of embedded and consumer USB devices along with at least one device being in host mode. While it is understood that the software functions of the head unit are essential to building a complete system, the designs of which can vary significantly and this example is provided only as a means of demonstrating one way to utilize the functionality of the present invention.

What is claimed is:

1. A system disposed within a vehicle, comprising:
   an embedded Universal Serial Bus (USB) Host system;
   a USB Hub having a plurality of USB Ports and interconnected to the embedded USB Host system, said USB Hub configured to simultaneously broadcast data from the embedded USB Host system to each USB Port in the plurality of USB Ports and to transmit data from each USB Port to the embedded USB Host system;
   a USB Bridge interconnected to the USB Hub and configured to connect the embedded USB Host system to a second USB Host; and
   a USB routing switch interconnected to the USB Bridge, the USB Hub, and the plurality of USB Ports, wherein the USB routing switch is configured to connect a first USB Port of the plurality of USB Ports to the USB Hub through the USB Bridge when a consumer device connected to the USB Port is the second USB Host and is configured to initiate bidirectional communication with the embedded USB Host, and wherein the USB routing switch is configured to connect the first USB Port directly to the USB Hub when the consumer device connected to the first USB Port is configured to only respond to communication from the embedded USB Host, thereby rendering the consumer device compatible with the embedded USB Host system.

2. A system as recited in claim 1, wherein the USB routing switch is configured to connect the first USB Port to the USB Hub through the USB Bridge when a first consumer device connected to the first USB Port is the second USB Host, and wherein the USB routing switch is configured to simultaneously connect a second USB Port of the plurality of USB Ports directly to the USB Hub when a second consumer device connected to the second USB Port is the USB Device, thereby rendering the first and second consumer devices compatible to function simultaneously with the embedded USB Host system.

3. A system as recited in claim 1, wherein the system is configured to recognize whether the consumer device connected to the USB Port is the second USB Host or the USB Device and control the USB routing switch accordingly.

4. A system as recited in claim 1, wherein the USB Hub, the USB Bridge, and the USB routing switch system are disposed within a USB Hub Module.

5. A system as recited in claim 1, wherein the system further comprises an infotainment system containing the embedded USB Host system.

6. A system as recited in claim 4, wherein the system is configured to dynamically switch operation of USB Ports connected to the USB Hub Module between USB Device mode and USB Host mode.

7. A system as recited in claim 4, wherein the USB Hub Module is connected to the embedded USB Host system and the plurality of USB Ports connected to a plurality of consumer devices.

8. A system as recited in claim 7, wherein the USB routing switch is configured to connect each consumer device of the plurality of consumer devices to either the USB Bridge or the USB Hub based on whether each consumer device attached to each USB Port in the plurality of USB Ports is the USB Host or the USB Device.

9. A system as recited in claim 1, wherein the USB routing switch comprises a plurality of USB analog multiplexing switches.

10. A system as recited in claim 1, wherein the USB Bridge is configured to control the USB routing switch.

11. A system as recited in claim 1, wherein the USB routing switch comprises digital routing logic.

12. A system as recited in claim 1, wherein the USB Bridge comprises a bridge controller as well as endpoint buffers.

13. A system as recited in claim 12, wherein the endpoint buffers are configured to support a USB data connection pipe between an infotainment system and the consumer device.

14. A system as recited in claim 1, wherein the system further comprises an infotainment system with the embedded USB Host which is electrically connected to the USB Hub via a single USB data connection.

15. A system as recited in claim 1, wherein the system further comprises an infotainment system, wherein the system is configured to support simultaneous active USB data connections between the infotainment system and multiple consumer devices, at least one of which is the second USB Host while others are USB Devices.

16. A system as recited in claim 1, wherein the system further comprises an infotainment system, wherein the system is configured to support simultaneous active USB data connections between the infotainment system and some combination of embedded devices and consumer devices that are USB Devices along with at least one that is the second USB Host.

17. A system as recited in claim 11, wherein the USB Hub, the USB Bridge, and the USB routing switch system are integrated in an Integrated Circuit (IC).

* * * * *